United States Patent
Carr et al.

(10) Patent No.: US 10,354,203 B1
(45) Date of Patent: Jul. 16, 2019

(54) SYSTEMS AND METHODS FOR CONTINUOUS ACTIVE MACHINE LEARNING WITH DOCUMENT REVIEW QUALITY MONITORING

(71) Applicants: Terence M Carr, Cincinnati, OH (US); Leo Zamansky, Mason, OH (US)

(72) Inventors: Terence M Carr, Cincinnati, OH (US); Leo Zamansky, Mason, OH (US)

(73) Assignee: SENTIO SOFTWARE, LLC, Washington, DC (US)

( * ) Notice: Subject to any disclaimer, the term of this patent is extended or adjusted under 35 U.S.C. 154(b) by 0 days.

(21) Appl. No.: 15/885,687

(22) Filed: Jan. 31, 2018

(51) Int. Cl.
  *G06F 16/35* (2019.01)
  *G06N 20/00* (2019.01)
(52) U.S. Cl.
  CPC ............. *G06N 20/00* (2019.01); *G06F 16/35* (2019.01)
(58) Field of Classification Search
  USPC .......................................................... 706/12
  See application file for complete search history.

(56) References Cited

U.S. PATENT DOCUMENTS

| | | | | |
|---|---|---|---|---|
| 5,905,982 A * | 5/1999 | Carey | ................... | G06F 16/289 707/694 |
| 7,949,728 B2 * | 5/2011 | Rivette | ................... | G06Q 10/10 709/219 |
| 8,019,750 B2 * | 9/2011 | Kosciusko | ........ | G06F 16/24534 707/718 |
| 9,372,895 B1 * | 6/2016 | Zamansky | .......... | G06F 16/3322 |
| 2004/0138968 A1 * | 7/2004 | Carr | ....................... | G06Q 30/02 705/30 |
| 2005/0102297 A1 * | 5/2005 | Lloyd | ................ | H04L 29/12132 |
| 2007/0038618 A1 * | 2/2007 | Kosciusko | ......... | G06F 16/24534 |
| 2007/0299755 A1 * | 12/2007 | Carr | ....................... | G06Q 30/02 705/35 |
| 2009/0171907 A1 * | 7/2009 | Radovanovic | ...... | G06F 16/3326 |

(Continued)

OTHER PUBLICATIONS

ACM DigitalLibrary Multi-Faceted Recall of Continuous Active Learning for Technology-Assisted Review, Gordon V. Cormack Maura R. Grossman Proceeding SIGIR '15 Proceedings of the 38th International ACM SIGIR Conference on Research and Development in Information Retrieval pp. 763-766 Aug. 9-13, 2015 ACM.*

(Continued)

*Primary Examiner* — Michael B Holmes
(74) *Attorney, Agent, or Firm* — Ronald L. Rohde

(57) ABSTRACT

Systems and methods for monitoring the quality of document reviews used in continuous active machine learning are described herein. Two orthogonal processes may be run simultaneously, asynchronously, and continuously. The first process performs continuous active machine learning for training machine classification models. The second process classifies documents that have been reviewed as part of the first process to generate classification scores of the reviewed documents. The original review may be compared to the classification scores using false negative and a false positive thresholds to identify documents that may have been incorrectly reviewed. A master review of identified documents is used to correct original reviews that were incorrect. Original incorrect reviews may be replaced in a training corpus by corrected reviews, and the models may be retrained using the corrected reviews.

20 Claims, 7 Drawing Sheets

(56) References Cited

U.S. PATENT DOCUMENTS

| | | | |
|---|---|---|---|
| 2009/0172514 A1* | 7/2009 | Radovanovic | G06F 16/951 |
| | | | 715/212 |
| 2016/0050535 A1* | 2/2016 | Mansfield | H04W 4/025 |
| | | | 455/456.3 |
| 2018/0341875 A1* | 11/2018 | Carr | G06N 20/00 |

OTHER PUBLICATIONS

IEEE Probabilistic action planning for active scene modeling in continuous high-dimensional domains, Robert Eidenberger; Thilo Grundmann; Raoul Zoellner, Published in: 2009 IEEE International Conference on Robotics and Automation, May 2009 pp. 2412-2417.*

Combining Active Learning and Semi-Supervised Learning Using Gaussian Fields and Harmonic Functions, Xiaojin Zhu, John Lafferty, Zoubin Gharramani Proceedings of the ICML-2003 Workshop on the Continuum from Labeled to Unlabeled Data, Washington DC, 2003. pp. 1-8.*

IEEE Active Learning With Gaussian Process Classifier for Hyperspectral Image Classification, Shujin Sun; Ping Zhong; Huaitie Xiao; Runsheng Wang Published in: IEEE Transactions on Geoscience and Remote Sensing ( vol. 53 , Issue: 4 , Apr. 2015) pp. 1746-1760 IEEE.*

* cited by examiner

SYSTEMS AND METHODS FOR CONTINUOUS ACTIVE MACHINE LEARNING WITH DOCUMENT REVIEW QUALITY MONITORING

FIELD OF THE PRESENT TECHNOLOGY

The present disclosure relates to systems and methods of continuous active machine learning using document reviews. More particularly the present disclosure relates to detecting errors in training corpus structures, detecting degraded model training, machine classification, false negative and false positive document review detection, correcting training corpus structures, and measuring reviewer quality.

SUMMARY

Various embodiments of the present technology include a method including performing continuous active machine learning comprising: a) selecting a batch of documents from the set of documents that have not been reviewed; b) classifying the batch of documents using the plurality of models, each model trained to calculate a relevance of the document to at least one of a plurality of categories; c) selecting one or more classified documents from the classified batch of documents for review based on the classification; d) receiving a review of the selected documents, the review for each document including an identity of the document reviewer and a determination by the document reviewer that the document was either responsive or non-responsive for each of the plurality of categories; e) storing the review and reviewed document in a reviewed document repository with the identity of the document reviewer; and f) retraining the plurality of models based using the reviews and reviewed documents of the reviewed document repository to generate a plurality of models; g) repeating a-f. The method further includes performing quality analysis while asynchronously executing performing the continuous active machine learning a-g, the quality analysis comprising: h) selecting one or more reviewed document from the reviewed document repository; j) classifying each of the selected the documents using the plurality of generated models to generate a category score for each category; k) analyzing each of the classified selected documents for each category to select documents for review by a master reviewer, the analyzing comprising submitting the document to the master reviewer if either: the document review for the category was relevant, and the category score is less than a false positive threshold, or the document review for the category was non-relevant, and the category score is greater than a false negative threshold. The method further includes l) if the selected document is submitted to the master reviewer: receiving a review of the selected document from the master reviewer including a determination by the master reviewer that the document was either relevant or non-relevant for each of the plurality of categories, comparing the master review of the selected document to the review by the document reviewer, and replacing the review by the document reviewer in the reviewed document repository with the master review for the document if the review by the master reviewer for any category of the document is different from the review by the document reviewer for the category; and m) if an original review for any of the selected documents is replaced in the reviewed document repository, retraining the plurality of models using the replaced reviews. The method further includes repeating h-m.

Various embodiments of the present technology include a non-transitory computer readable storage media having a program embodied thereon, the program being executable by a processor to perform a method for retraining one or more models of a machine classifier, the method comprising: selecting a reviewed document and corresponding original review stored in a training set for one or more trained models of the machine classifier; classifying the selected document using the one or more models to generate a category score for each category using the machine classifier; comparing the generated category scores for the selected document to original review of the selected document. The method further includes submitting the selected document to a master reviewer for master review if either: any category score is less than a false positive threshold and the original review is positive for a category, or any category score is greater than a false negative threshold and the original review is negative for a category. The method also includes receiving a master review of the selected document from the master reviewer; comparing the received master review of the selected document to the original review of the selected document; replacing the original review in the training set with the received master review if the received master review for any category of the document is different from the original review for the category; and initiating retraining of the one or more models if the original document review in the training set has been replaced by the received master review.

Various embodiments of the present technology include a system including a document classifier; a training set; a model builder; a means for performing continuous active machine learning using the classifier, the model trainer, and document reviews in the training set to retrain classifier models used by the classifier for classifying documents received from a document repository, the means for performing continuous active machine learning executed continuously. The system further includes a means for correcting review errors in training corpus, the means for correcting review errors configured to be executed continuously and asynchronously with respect to the means for performing continuous active machine learning, the means for correcting review errors comprising: a means for identifying document reviews in the training set having potential review errors using the classifier models; and a means for updating classifier models using master reviews, document reviews stored in the training set, and the model trainer.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
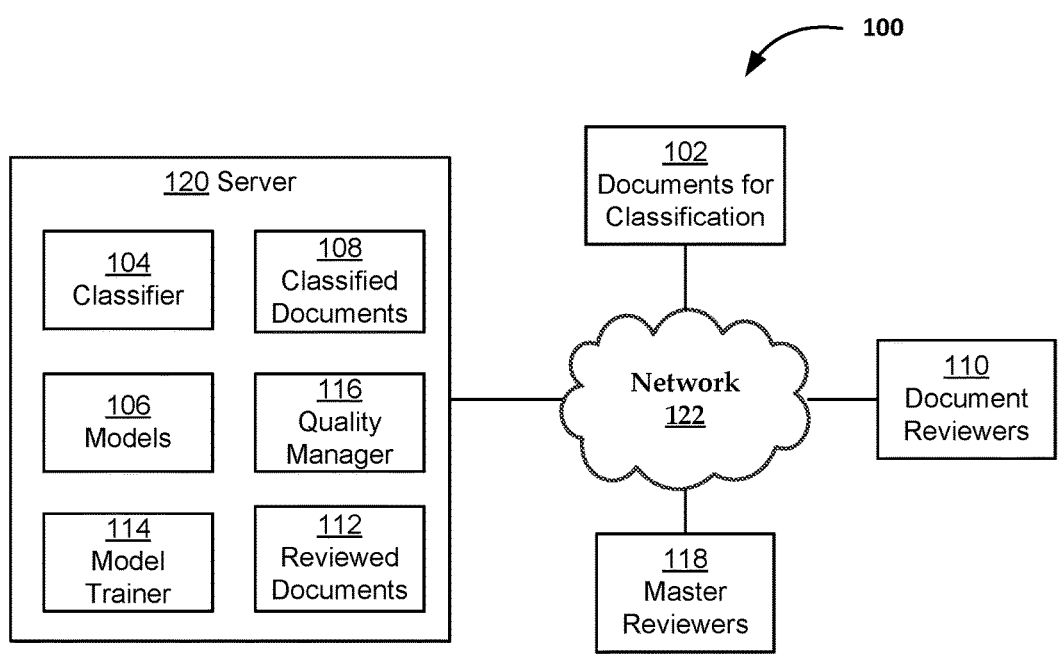
FIG. 1 illustrates an exemplary continuous active learning system in accordance with aspects of the technology.

For context, Technology Assisted Review (TAR) as it applies to document classification, uses human reviews the reviewers to create a set of relevant documents, sometimes called seed set. The seed set is used to train or build one or more models. Once the models are trained, TAR then applies the models to classify a population of documents. The quality of a TAR classification depends on the quality of the reviews of the seed set of relevant documents, and whether or not the types of documents reviewed includes all possible types of documents in the population.

Continuous active machine learning differs from TAR in that it uses an iterative process to build one or more models that are each capable of identifying content relevant to a specific issue (e.g., category). It is an iterative process in that a a batch of documents from a document collection is classified. A document from the classified batch that is expected to be relevant is selected and displayed to a document reviewer for confirmation. The document reviewer decides if the document is relevant or non-relevant. The confirmation by the reviewer of relevance or non-relevance for that document is used to refine the model so that in the future the system will more accurately identify documents to present to the reviewer. It is noteworthy that in some embodiments both relevant and non-relevant documents are useful in refining the model. As more documents are selected by the classifier and reviewed by reviewers, the quality of the classifier improves. However, the quality of machine classification is limited by the quality of the reviews.

Machine classification (or simply classification) is the process of applying a model to a document to generate a score that indicates how likely the document is to be relevant to a tag or category associated with the model. Another term for machine classification is categorize. The terms "classify" and "categorize" may be used interchangeably throughout this specification. Classification models can be applied to a set of documents to determine one or more scores indicating that the documents are relevant to one or more, respective, categories (e.g., medical device test reports, FDA applications, device engineering and prototyping, device marketing, financial documents, etc.). The system may use one or more document classification models that are each tuned to a specific category. For example, a document classification model can be created to process documents and locate those that are relevant to medical device failure reports and then tuned or retrained using a training set or training corpus of documents to improve accuracy using human input.

A document review may be performed by a human, machine or other entity. A document review differs from a classification in that the document review typically generates either 1 (the document is in the category) or 0 (the document is not in the category). A classification may generate a score between 0.0-1.0 (or a percentage between 0-100%) indicating a likelihood that the document is in the category or relevance of the document to the category.

In general, embodiments of the present disclosure are directed to improving systems and methods that employ continuous active machine learning to create and update document machine classification models based on continuous feedback. In a continuous active machine learning system, feedback from a human review of machine classified documents can be used to substantially improve the accuracy of a subsequent machine classification. For example, a machine can use models to classify all of the documents in a 1,000,000 document universe, and then present a selection of those documents to a human for review. The documents may be selected for presentation based on scores generated for various categories during the machine (or model) classification. The reviewed documents and document reviews may be added to a training set. Then the models can be retrained using the results of the reviewed documents, e.g., as reviewed documents and/or document reviews are added to the training set.

Additional document reviewers (e.g., human reviewers) can be used to review machine classified documents. The models can be retrained using documents in the training set, including documents reviewed by the additional reviewers. As more documents and/or types of documents are reviewed, the reliability of the models and classifier improves. However, in the course of developing the technology of the present application a surprising and unexpected result has been observed that the reliability or consistency classification using the retrained models can deteriorate as the number of additional reviewers increases. As the reliability of the models deteriorates, the machine classification becomes less reliable. Further discussion of the various effects of increasing the number of reviewers on the reliability of machine classification is provided in Appendix A attached to the present application and incorporated by reference in its entirety herein.

A typical document collection or universe includes 100,000 to 10,000,000 documents or more. However a typical human can only review about 45 documents per hour. Perhaps 130 humans could be hired to complete the review of 1,000,000 in about a month. Unfortunately, document reviewers make mistakes, and adding additional document reviewers to increase throughput for reviewing documents and training models may result in the models becoming increasingly inconsistent or unreliable because of reviewer mistakes. Problems addressed by this technology include an understanding that as more documents are reviewed, it requires more time to complete the review by a given number of reviewers. However, as more reviewers are added, consistency of the reviews suffers. As a result, it becomes more difficult to retrain models that produce consistent and reliable classifications.

In the course of developing the claimed technology, it has been determined that as the number of document reviewers is increased, errors by reviewers who are less than highly skilled and/or inherent inconsistencies between the reviewers can result in degradation of the machine classification accuracy to 50% or less. Machine classifications using a large number of reviewers have been found which produce results that are no better than a coin toss. And when a classification accuracy is less than 50%, which has also been observed, flipping a coin is better than using the classifier. As a result, a point of diminishing returns is reached where models cannot be trained using a small number of highly reliable reviewers in the time allotted, but an adequate reliability of the models cannot be attained when the number of reviewers is large enough to do the training within the allotted time.

Simply put, a classifier is no better than the reviewers. This is a problem for both continuous active machine learning and TAR. Unfortunately, using a larger number of inaccurate reviewers can magnify their error rates rather than overcome them. Various solutions have been tried. Simply measuring the accuracy of a classifier using various methods does not identify which reviews are inaccurate or which reviewers are performing inaccurate reviews. Another solution that has been tried includes using a highly skilled reliable reviewer to check reviews and reviewers for accuracy. However, highly skilled, reliable reviewers are a scarce resource. Thus, checking all the reviews by the few reliable reviewers that are available may defeat any gain that might be realized from adding additional reviewers to augment the reliable reviewers.

A few reliable reviewers may be used to perform a random sampling of a small percentage of the reviews for accuracy. Unfortunately, detecting a small percentage of the inaccurate reviews or inconsistent reviewers does not substantially improve the models. For example, even if 1% of the reviews can be randomly sampled within a reasonable time frame, that means that the incorrect reviews present in the 99% of the documents that are not part of the random review sample are missed and remain uncorrected in the training set. Unfortunately, these incorrect reviews contribute to the unreliability and inconsistency of the models, and to classifications using the unreliable models.

In the course of developing the claimed technology, it has been determined that machine classification techniques can be used to help efficiently and quickly identify document reviews that are incorrect and further can identify reviewers who are inconsistent in their reviews. It has been experimentally verified that a large percentage of incorrect reviews can be quickly identified by claimed technology and submitted to reliable reviewers for correction. Moreover, it has been experimentally demonstrated that a large percentage of the reviews identified as incorrect using claimed technology are in fact incorrect. Thus, the claimed technology has been demonstrated experimentally to be very fast and very efficient when used for training machine classification models using less than highly skilled reviewers.

Prior to discussion of example embodiments of systems and methods of the present disclosure, a set of terms and definitions are discussed for context. As used herein, a project is represented by a set of documents, a set of models, and a set of tags. In various embodiments, a document is a file that is provided in textual format, graphics format, and mixed text and graphics. In various embodiments, document content includes text, images, graphs, drawings, videos, audio, animation, media, and/or the like. Typically text is analyzed by a classifier using models based on text information. However, any of these elements may be related to a tag, and models may be built for the elements that contribute to classification of the document. For example, a tag may include a named person, and face recognition may be used to classify documents that include images to determine a probability that the document is about the person. The original format of the document may be different (e.g., email, Word, PDF, jpeg, mpeg, etc.)

A document reference comprises a document identifier and/or one or more probabilities or scores for the categories. In various embodiments, the document identifier is a pointer, token, database entry, and/or the like that may indicate where in the document universe or other document database, the document may be found. Each of the scores associated with the document or document identifier may be based on a different tag or category.

Classification is the process of applying a model to a document to generate a probability or score that the document is relevant to a tag associated with the model. Another term is categorize. The terms "classify" and "categorize" may be used interchangeably throughout this specification. When a document is classified using multiple models, a probability may be calculated to indicate a relevance or probability for each model. A document may be classified as being relevant if a score for one or more category exceeds a threshold for the category.

A classification of a document may be represented in a variety of ways. For example, a plurality of probabilities or category scores, each representing a model, may be appended to a document identifier or otherwise incorporated into a document reference. In some embodiments, the plurality of category scores are appended or otherwise incorporated into the document. The category scores may be incorporated as text, numeric data, or metadata. In other embodiments, a classification includes a document reference or document identifier (ID) and the associated plurality of category scores. Then, a classified document may placed in or moved to a classified document repository, with or without the associated plurality of probabilities or category scores.

A category score generated by classification of a document is a measure of how likely the document is to be relevant to the category for which it is being evaluated. The category score may be represented as a number, e.g., a number between 0.0 and 1.0 or as a percentage between 0-100%. In various embodiments, the category score is probability or a function of the probability, e.g., a polynomial function, exponential function, log function, hyperbolic function, and/or the like. The terms "relevance" and "score" and "probability" may be used interchangeably throughout this specification. For example, an email determined to have a category score of 85% may be considered likely to be relevant to the category of "financial records" because of included data that are indicative of accounting information for a company. In some embodiments, a category score is an ordinal number indicating a position within an ordered or ranked set of classified documents for a particular category or one or more categories. The category score may be represented by a percentile number indicating a number or percentage documents more relevant or less relevant for a particular category or one or more categories. A document may have multiple category scores including one or more scores for each tag or model.

A tag is an issue or a category provided by the user. The terms "tag," "issue," and "category" may be used interchangeably throughout this specification. Generally, a given project includes multiple tags. However, it is also contemplated that a project may have a single tag. Examples of tags include contracts, language, country, financial data, travel documents, person of interest, review articles, technical articles, engineering data, confidentiality agreements, advertising claims, employee compensation, allegations of fraud, and/or the like.

In various embodiments, a model comprises an algorithm or equation that can be applied to a document to determine the category score that document is relevant (responsive) to that model. A high category score indicates that the document is likely to be about the tag, category, or issue (the document is responsive, relevant, positive). A low category score indicates that document is not likely to be about the tag, category, or issue (the document is non-responsive, not relevant, or negative). A model may be used by a classifier to analyze documents for relevance to a tag. A relevant document, also called responsive or positive, could be responsive for several tags. In some embodiments, a model comprises a parameter array trained and configured for use by an algorithm or equation to analyze the documents. A parameter array of a model may be 1, 2, 3, or more dimensional, and may include 1; 2; 4; 8; 10; 100; 1,000 10,000; 100,000; 1,000,000; or more parameters. Parameters may be represented using arrays of binary values, octal numbers, hexadecimal numbers, BCD numbers, integers, rational numbers, irrational numbers, complex numbers, floating point numbers, text, and/or the like.

A model may be trained using documents that have known properties. For example, the model may be calculated using a set of both responsive documents and a set of non-responsive documents that have been reviewed by document (e.g., human) reviewers. Similarly, a model may be trained using keywords, for example applying equations to a number and identity of various keywords in a document. A training set may be used for training the model. The training set may include reviewed documents and/or document reviews.

The quality of a model may be characterized or evaluated using three measures:

Precision→Number of True Positives/(Number of True Positives+Number of False Positives);   (1)

Recall→Number of True Positives/(Number of True Positives+Number of False Negatives)   (2)

f1—A harmonic mean of the Precision and Recall or f1=2*Precision*Recall/(Precision+Recall)   (3)

As new document reviews are added to the project, the models associated with tags are recalculated and updated. The f1 score of a model may be used (e.g., as a threshold) for determining an endpoint or stopping point of the document review process or the continuous active machine learning process. The f1 score may also be used for qualifying the machine classification for use in legal proceedings.

A master reviewer is a reviewer who is highly skilled in document review for one or more category. A document review by a master reviewer is considered to be very reliable and have a very high probability of being correct. A master reviewer may be qualified, for example, by having reviewed a predetermined number of documents correctly or having attained a predetermined percentage of correct document reviews. In some embodiments, a master reviewer may be considered the final authority and by definition all document reviews by the master reviewer are correct. In some embodiments, a master reviewer is a plurality of reviewers. The correct review may be decided by a majority or vote of the plurality of reviewers. Generally it may be considered that a document reviewer is less skilled than a master reviewer and the percentage of correct reviews for a document reviewer is substantially less than for a master reviewer.

A document review and/or master review may be performed by a human, machine or other entity. A document reviewer determines that a document is either in a category or not in the category, that is, either relevant to the category or not relevant to the category. A document review differs from a classification in that the document review typically generates an output for each category of either 1 or 0 (relevant or not relevant, responsive or non-responsive, positive or negative), whereas a classification generates a score for each category (category score) between 0.0-1.0 or percentage 0-100% (a likelihood the document is relevant).

Output of a document review (review output) may be represented in a variety of ways. In various embodiments, review outputs are represented as 1 or 0; relevant or not relevant; positive or negative (+ or −); responsive or non-responsive; and/or the like. A plurality of review outputs, each representing a model, may be appended to a document identifier or otherwise incorporated into a document reference. In some embodiments, the plurality of category review outputs are appended or otherwise incorporated into the document. The category review outputs may be incorporated as text, numeric data, or metadata. In other embodiments, a document review includes a document reference or document identifier and the associated plurality of category review outputs. Then a reviewed document may be moved to a reviewed document repository, with or without the associated plurality of category review outputs.

As discussed above, a problem may arise during the process of continuous active learning when a document reviewer is not very good and, for example, makes too many mistakes. The problem may be compounded by using multiple reviewers. Even when multiple reviewers might individually be good, multiple reviewers can have differences that result in inconsistent review results.

A solution to the problem is to perform a second process, namely a quality evaluation of the models and/or reviewers. The first process (continuous active machine learning) and the second process (continuous quality evaluation) are two separate, independent or orthogonal processes. In some embodiments, the two processes are both implemented as continuous loops that are asynchronous with respect to each other.

The model quality evaluation of the second process applies the current models to documents that have been reviewed as part of the first process. The application of the models to reviewed documents using the classifier may be used to identify documents that may have been incorrectly reviewed by a document reviewer. There are two types of incorrect reviews, i.e., false negative and false positive.

False positive: the original document review designated the document as having been responsive to a specific issue. But document is not responsive. If the category score is LOW for that specific issue, the document should be identified in second process as a possible false positive. For example, a false positive threshold for a category score for a particular category may be set to 25%. If the original document reviewer determined that the document IS responsive (i.e., positive) for the specific category, but the category score is 15% (below the threshold) then the original document review is a potential false positive.

False negative: the original document review designated the document as having been NOT responsive to a specific issue or category. But the document is responsive. If category score for the document classification is HIGH for that specific issue, the classification of the document is identified in the second process as a possible false negative. For example, a false negative threshold for a category score for a particular category may be set to 75%. If the original document reviewer determined that the document is NOT responsive (i.e., negative) for the specific category, but the category score is 80% (above the threshold) then the original document review is a potential false negative.

The documents having categories identified as either possible false positives or false negatives are presented to a quality control reviewer (master reviewer) for verification. The master reviewer may review the all the categories for the document. If the review of the document by the master reviewer confirms either a false positive or false negative for any category, then the corrected review replaces the incorrect review. The corrected review is then used to retrain and update the models. Moreover, if the review of the document by the quality control reviewer is different from the original review for any category, including categories other than the particular category identified as a false positive or false negative, then the review by the quality control reviewer may also be used to retrain and update the models. The original, incorrect review may be removed from the training corpus. In some embodiments, this is accomplished by replacing or overriding the original (incorrect) review in a reviewed document repository or training set with the review by the quality control reviewer.

It is noteworthy that both responsive and non-responsive status of categories in documents may be used for training the models. Using the claimed technology, both false positive reviews and false negative reviews may be identified and replaced or overridden. The models may be corrected/improved by retraining using the replaced reviews, e.g., in the training set. The efficiency of the identification and master review is improved using classification of the reviewed documents to provide scores for calculating a likelihood of a false positive or false negative category review. This is because a classification is much faster than a master review, and by using the claimed technology, the majority of documents do not need to be submitted to the relatively slow process of master review, only the suspected incorrect documents. A document that has been reviewed by a master reviewer may be flagged such that it is omitted from selection for classification and master review in subsequent execution of the second process.

As discussed elsewhere herein, the second process may be executed continuously and asynchronously with respect to the first process. The two processes may both be implemented as continuous loops that are asynchronous with respect to each other. That is the state of a first process may be independent of a state of the second process. Thus, both the first and second processes may be running at the same time, independently. For example, a loop that performs quality evaluation of the reviews may cycle many times for each cycle of a loop that performs continuous active machine learning. At other times, the loop that performs continuous active machine learning may cycle many times for each cycle of the loop that performs the quality evaluation of the reviews.

In some embodiments, the second process executes the model quality evaluation on a random schedule, e.g., 5% of the reviews selected at random. The percent may be adjusted based on the confidence level history. For example, as the average confidence level in the accuracy of the reviews or lack of errors in the reviews changes, the percentage may be increased or decreased as appropriate. In some embodiments, the second process executes the model quality evaluation of the reviews periodically, e.g., every tenth review or every ten seconds. The period may be adjusted based on the confidence level history. For example, as the average confidence level rises, the period may be increased or decreased.

FIG. 1 illustrates an exemplary continuous active learning and correction system 100 in accordance with aspects of the technology. Structural and hardware components of the system 100 includes documents for classification 102, a server 120 for classifying the documents, one or more document reviewers 110 for improving the classification, classified documents 108, reviewed documents (or training set) 112, one or more master reviewers 118, and a network 122. The server 120 of FIG. 1 includes a classifier 104, one or more trained models 106, a model builder or trainer 114, and a quality manager 116. Persons having ordinary skill in the classification arts with this disclosure before them would understand how to build and implement the classifier 104, one or more trained models 106, and model trainer 114. Various aspects of the quality manager 116 are discussed in more detail elsewhere herein. The server 120, documents for classification 102, document reviewers 110, and master reviewers 118 may be coupled via the network 122. Various components of system 100 are illustrated as being implemented on the server 120, which is in communication with other components (documents for classification 102, document reviewers 110, and master reviewers 118) via the network 122.

While the server 120 of FIG. 1 is illustrated as including the classifier 104, the models 106, the classified documents 108, the model trainer 114, the reviewed documents 112, and the quality manager module 116, one or more of these components may be separate components in communication with the server 120 via the network 122 or in direct communication with the server. While the document reviewers 110 and the master reviewers 118 are illustrated as being in communication with the server via the network 122, either or both may be in direct communication with the server 120. While the documents for classification 102 are illustrated as being in communication with the server via the network 122, the documents for classification 102 may be in direct communication with the server 120 or stored within the server 120.

As discussed above, the claimed technology comprises a first process and a second process that run independently or orthogonally.

First Process

In a first process, the classifier 104 uses the models 106 to classify a document or batch of the documents for classification 102 and store them as classified documents 108. One or more documents may be selected from the classified documents 108 and presented to document reviewers 110 for review. Each document may be reviewed by one or more of the reviewers 110. Each of the reviewers 110 may review one or more categories for a document. One or more of the reviewed documents may be provided to the model trainer 114 for use in rebuilding or retraining the models 106. For responsive and/or non-responsive reviews, the identity of the reviewer 110 who reviewed the documents and the output of the document review may stored as stored documents or stored document reviews, for example, in the reviewed document repository 112, and/or may be tracked, for example, using the quality manager 116. The reviewed document repository 112 may be used as a training set or training corpus for training the models 106 for the machine classifier 104.

Second Process

In a second process, a selection of one or more reviewed documents 112 (selected documents) may be analyzed for accuracy of the review. The selected documents may be selected from the reviewed documents 112 (reviewed document repository 112) using the quality manager 116. The selected documents are then reclassified using the models 106 and the classifier 104 to generate a category score for each category of the selected document. Each of the selected documents may be submitted to the quality manager 116 along with the category score (0 to 1 or percentage 0-100) generated by the reclassification for each category, as well as the identity of the document reviewer 110 and category result (1 or 0) of the review for each category by the document reviewer 110. For each of the selected documents, the quality manager 116 may analyze the document in the context of the document review and classification scores for a potential false positive and/or a potential false negative. If either a potential false positive or potential false negative is detected for any category, the quality manager 116 may submit the selected document to a master reviewer 118 who is highly skilled in reviewing documents, for confirmation.

False positive: for each category if the original review result is 1 (positive) the classification score for the category (category score) may be compared to the false positive threshold for the category. If the false positive threshold is greater than the category score, then the original review of the selected document is a possible false positive. For example, a false positive threshold for a model score for a particular category may be set to 25%, but the category score for the category is 15%, which is less than the false positive threshold (i.e., the false positive threshold is greater than the score) then the original review of the selected document was a potential false positive. As a result of the false positive determination, the selected document may be presented to a master reviewer 118.

False negative: similarly for each category, if the original review of the selected document result is 0 (negative) the category score may be compared to the false negative threshold for the category. If the false negative threshold is less than the category score, then the review of the selected document is a possible false negative. For example, a false negative threshold for a model score for a particular category may be set to 75%, but the category score for the category is 80%, which is greater than the false negative threshold (i.e., the false negative threshold is less than the score) then the original review for the selected document was a potential false negative. As a result of the false negative determination, the selected document may be presented to a master reviewer 118.

If the master reviewer 118 returns a determination that any original review result for the selected document was in error, the quality manager 116 may correct the review for the selected document and replace or override the original review of the selected document with the corrected review of the selected document in the reviewed documents 112. Replacement of the original review with the master review may include storing the master review in the reviewed documents 112. In some embodiments, the master review (master review responsive tag list) is stored along with metadata about the master review, such as master reviewer identity, location of master review, master review time stamp, and/or the like, may be stored for analysis. The models 106 may be rebuilt or retrained using the model trainer 114 and the reviewed documents 112 that include corrected reviews. In some embodiments, the retraining is initiated by replacement of an original review by master review.

The thresholds for determining false positives and false negatives may be adjusted as the number of errors decreases. For example, as the number of false positives decreases, a 25% threshold may be lowered to 20% to decrease the sensitivity to potential false positives. In another example, as the number of false negatives decreases, a 75% threshold may be raised to 80% to decrease the sensitivity to potential false negatives.

In some embodiments, the thresholds for detecting false positives or false negatives may be adjusted to reduce the probability of an undesirable result. For example, failure by the reviewer to detect a responsive review and labeling the responsive document as negative, is a false negative. But if a false negative review is very undesirable or expensive or cannot be tolerated for some reason, the false negative threshold can be set very low, e.g. 35%. This will serve to reduce the number of potential false negatives that are missed by the classifier.

The determination by the master reviewer 118 may be used for rating a reliability of the document reviewers 110. That is, the results of the second process may be used to measure the performance of each document reviewer 110 and determine their quality. For example, the original review along with metadata about the review, (responsive tag list) such as document reviewer identity, location, time stamp, and/or the like, may be stored for analysis. Additional data about the original review includes responsive tag list predicted by the category scores, key, responsive tag (the most responsive tag), the highest category score, the category score for each tag, and/or the like. Data about a document reviewer 110 may be collected from stored reviews that contain known errors. The data may be analyzed to generate statistics about the document reviewer 110. The analysis may correlate errors with category, time of day, day of the week, day of the month, number of reviews performed during a session, and/or the like. The type of errors (false positive, false negative) may be correlated by the analysis.

The analysis may be used to identify document reviewers 110 who make too many confirmed false positive and/or false negative types of review errors. These reviewers 110 may be reassigned, retrained, or removed. The analysis may also be useful for determining reviewers 110 who excel or consistently provide correct reviews. The best reviewers 110 may then be placed on larger or more complex sets of documents. For example, consider two document reviewers R1 and R2. Reviewer R1 makes 2 errors in the first set of documents, 3 errors in the second set, and 2 in the third set. Reviewer R2, on the other hand, makes 1 error in the first set, 1 error in the second set, and 5 errors in the third set of documents. It can be determined that reviewer R1 is better than reviewer R2, even though both reviewers have made the same number of errors.

The results of the second process may also be used to take corrective actions to help the document reviewers 110 to improve their work. For example the results may be used to determine when a particular reviewer 110 performs better reviews according to time of day, number of reviews, or under various other conditions. In another example, reviewers 110 may be reassigned to projects according to types of subject matter in which they have better results.

The results of the second process may also be used to calculate the precision, recall, and f1 statistics (defined elsewhere herein) of the review and provide an analysis of the quality of the machine classification system. These scores may be used for establishing and/or predicting legal defensibility of a corpus of responsive documents generated by machine classification and intended for use in litigation. In the course of developing the claimed technology, a surprising and unexpected result is that a machine classification using the claimed technology generally generates a responsive corpus of documents that have a higher quality or defensibility score (based on precision, recall, and f1 statistics, as well as other metrics) than a corpus generated using a human review of the same document universe.

Figure 2:
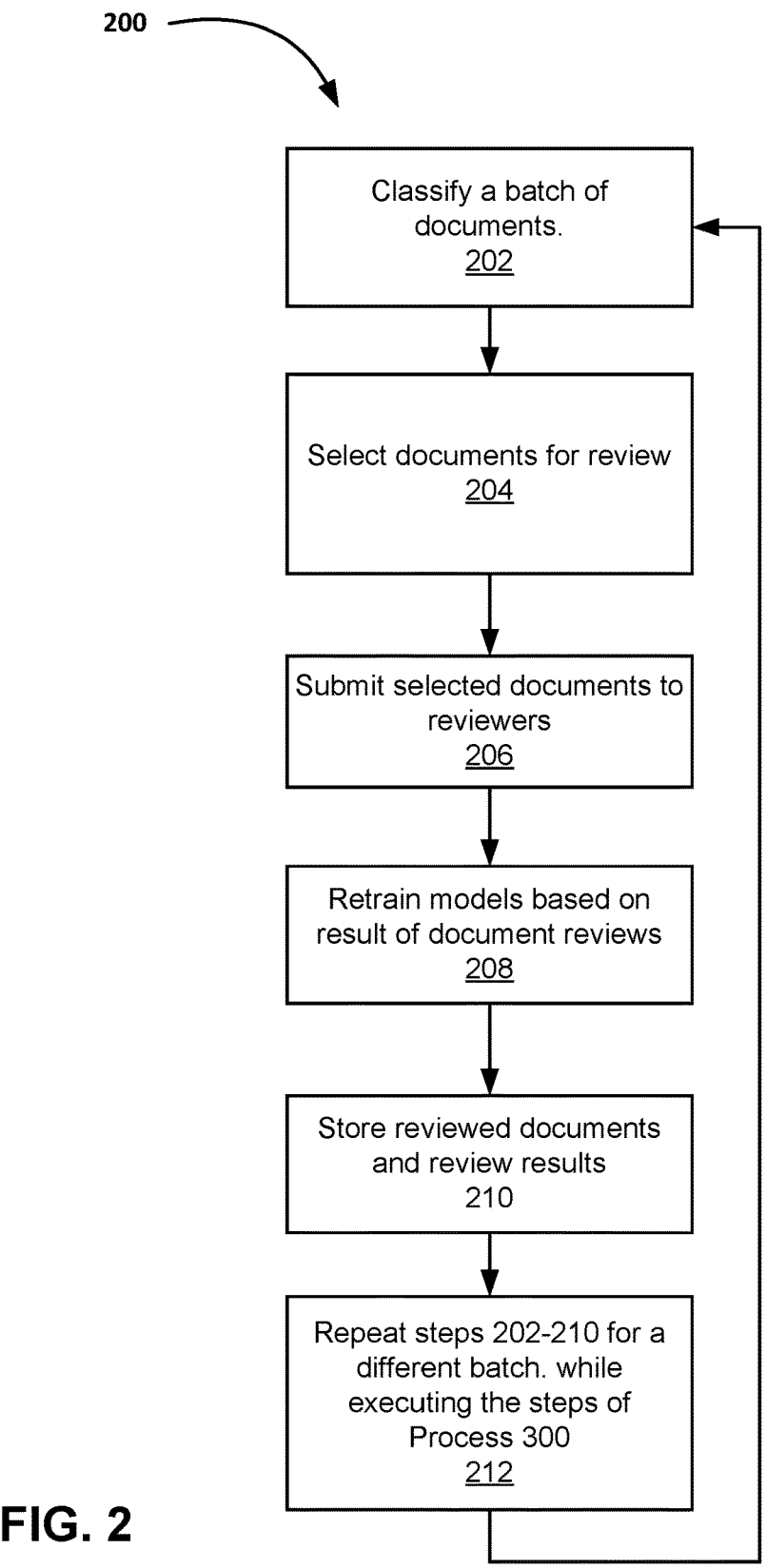
FIG. 2 is a flowchart illustrating an exemplary method of continuous active learning according to the present disclosure

FIG. 2 is a flowchart of an exemplary method 200 for continuous active learning according to the present disclosure. The steps 202-212 of FIG. 2 comprise an algorithm illustrating a means for performing the first process described above. The method 200 includes step 202 of classifying a batch of documents from the documents for classification 102. The batch of documents may be classified using the classifier 104 and one or more models 106. One or more classified documents 108 may be selected for review in step 204. The selected classified documents may be submitted to document reviewers 110 in step 206.

The method 200 further includes step 208, in which the one or more models 106 are retrained using the reviewed documents, e.g., documents 112 and the model trainer 114. The results of the review may be linked or associated with the reviewed documents 112 and stored at step 210. In some embodiments, the results of the review are stored in the same location as the reviewed documents 112. Optionally, the reviewed documents 112 and the results review may be stored in separate locations, while retaining the links or associations between the results of the review and the reviewed documents. In some embodiments, an identity of the document reviewer 110 is stored or associated or linked with the results of the review. The reviewed documents 112 include both documents that are responsive to one or more categories and/or documents that are not responsive to one or more categories. Persons having ordinary skill in the art with the present disclosure before them will understand how to make and use the classifier 104, models 106, and model trainer 114 used by the method 200.

At step 212, the steps 202-210 of method 200 may be repeated for another batch of documents using the retrained models 106. The first process illustrated by the method 200 may loop continuously. At the same time, a second process illustrated as method 300 illustrated of FIG. 3 (described below) may also loop continuously as it runs asynchronously with the first process.

Figure 3:
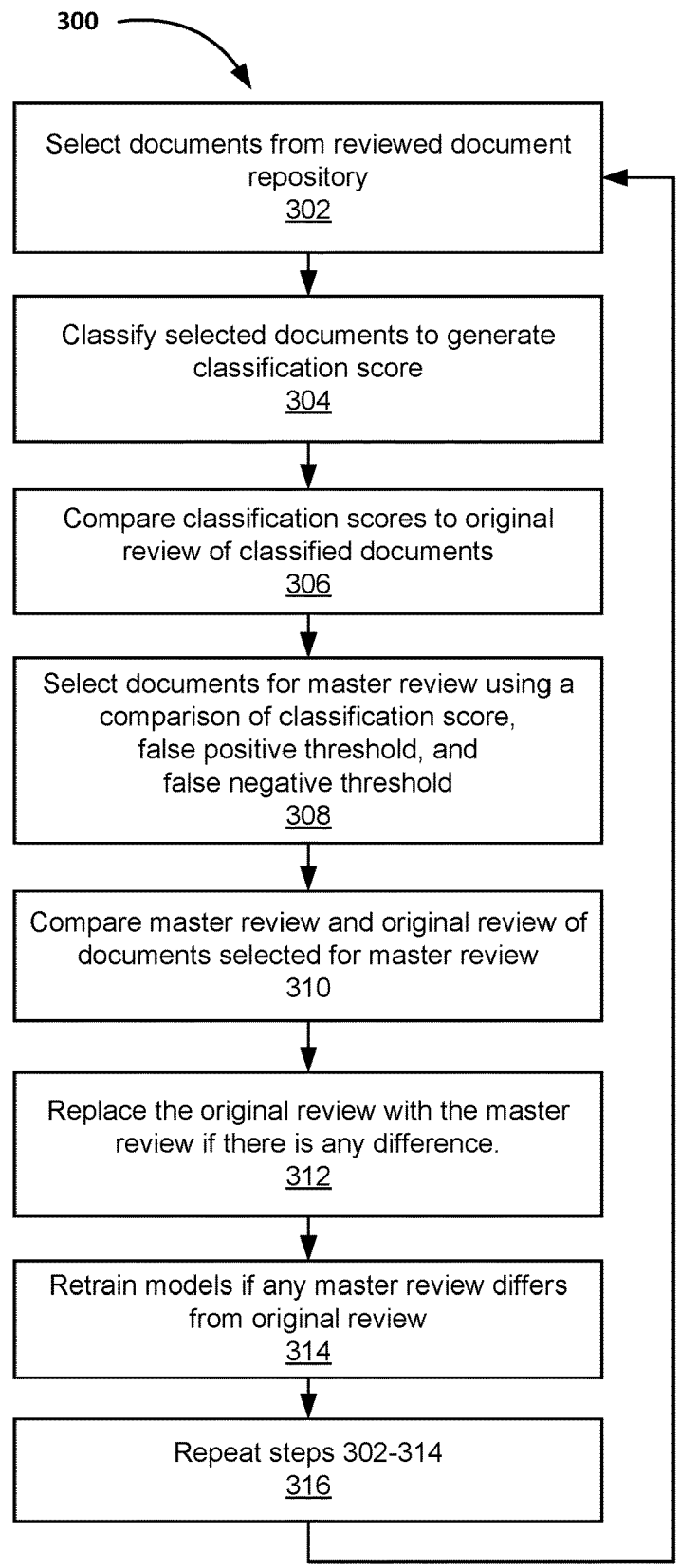
FIG. 3 is a flowchart illustrating an exemplary method for selecting and analyzing documents for review accuracy.

FIG. 3 is a flowchart of an exemplary method 300 for selecting documents from the reviewed documents 112 and analyzing the selected documents for accuracy of the review. The steps 302-316 of FIG. 3 comprise an algorithm illustrating a means for performing the second process described above.

At step 302 one or more documents are selected for quality analysis from the reviewed document repository 112. The documents may be selected as a batch, serially or using a random selection process. The selected documents may be selected using the quality manager 116. For simplicity a single selected document will be used for illustrating the second process of method 300. However, the second process may be performed using multiple selected documents. In some embodiments, the quality manager 116 may omit from selection documents in the reviewed document repository 112 that have been reviewed by a master reviewer 118.

At step 304, the selected documents are reclassified using the models 106 and the classifier 104. The reclassification generates a category score for each category.

At step 306 the generated category scores are compared to the original review of the selected documents. The original reviews may be accessed from the reviewed document repository 112 and include a review result for each category. The category score generated for each category may be compared to the corresponding original review result for that category. The comparison may be performed by the quality manager 116.

At step 308, documents are selected for master review using the comparison of category scores and original review. The selection of the documents for master review includes submitting the document to the master reviewer 118 if either: the document review for any category was relevant, and the category score is less than a false positive threshold, or the document review for any category was non-relevant, and the category score is less than a false negative threshold. The master reviewer 118 is a highly skilled or trained reviewer. It may be assumed that a review by the master reviewer 118 is correct. One master reviewer 118 may review all the categories of the document. Alternatively, a plurality of master reviewers 118 each review one or more categories in the, respective, master reviewer 118 is highly trained.

At step 310, the master review is compared to the original review in the reviewed document repository 112 for any documents reviewed by the master reviewer 118. The master review of a selected document may be received from the master reviewer 118 including a determination by the master reviewer 118 that the document was either relevant or non-relevant for each of the plurality of categories. The master review for any selected document may be compared to the original review of the selected document in the reviewed document repository 112.

At step 312, the original review in the reviewed document repository 112 is replaced by the master review if there is any difference between the original review in the reviewed document repository 112 and the master review. If the review by the master reviewer 118 for any category of the document is different from the original review for the category, the original is different from the master review, and the original review in the reviewed document repository 112 may be replaced with the master review for the document. In some embodiments, the original review is also stored for later analysis.

At step 314, the models are retrained if any master review differs from the original review. That is, if an original review for any of the selected documents is replaced in the reviewed document repository 112, the plurality of the models may be retrained using the model trainer 114 and the reviews in the reviewed document repository 112, which includes replaced reviews. The retraining at step 314 may be initiated for each master review that replaces an original review. In some embodiments, the retraining at step 314 is initiated after a number of master reviews.

At step 316, the method 300 returns to step 302 to repeat steps 302-314. The method 300 may repeat the steps 302-314 asynchronously with the repetition of the steps 202-212 of the method 200. It is noteworthy that running the second process, e.g., method 300 or 400 asynchronously results in correcting and updating the document reviews in the training corpus 112 transparently to the first process of continuous machine learning, e.g. method 200. That is, incorrect reviews in the review reviewed document repository 112 can be replaced with corrected reviews using the second process, without interfering with the first process. The first process adds new original reviews to the training corpus while the second process corrects the original reviews in the training corpus, transparently to the first process.

As discussed elsewhere herein, the first process illustrated by the method 200 may loop continuously. At the same time, a second process illustrated as method 400 illustrated of FIG. 4A or FIG. 4B (described below) may also loop continuously as it runs asynchronously with the first process.

Figure 4A:
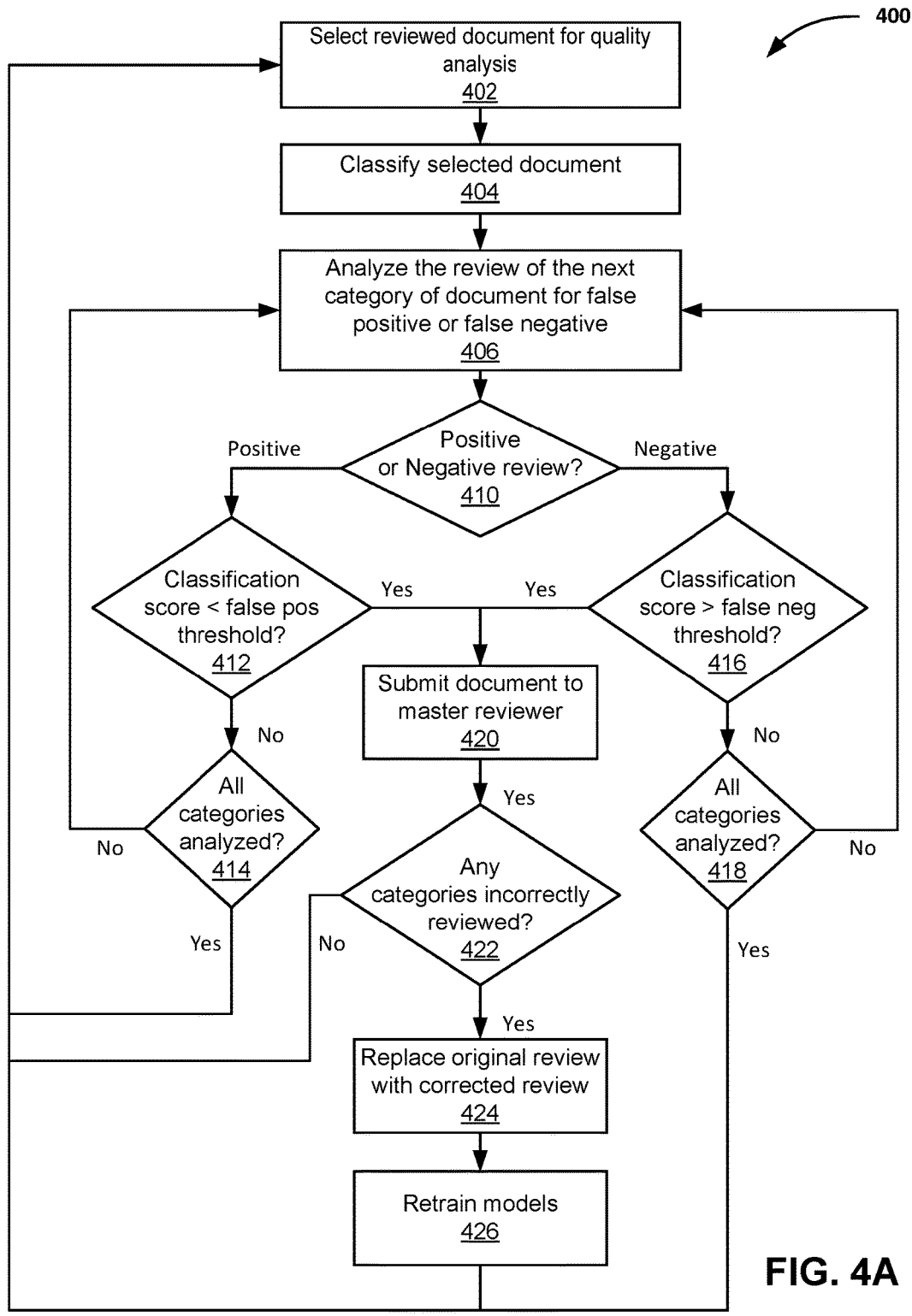
FIG. 4A is a flowchart illustrating another exemplary method for selecting and analyzing documents for review accuracy.
Figure 4B:
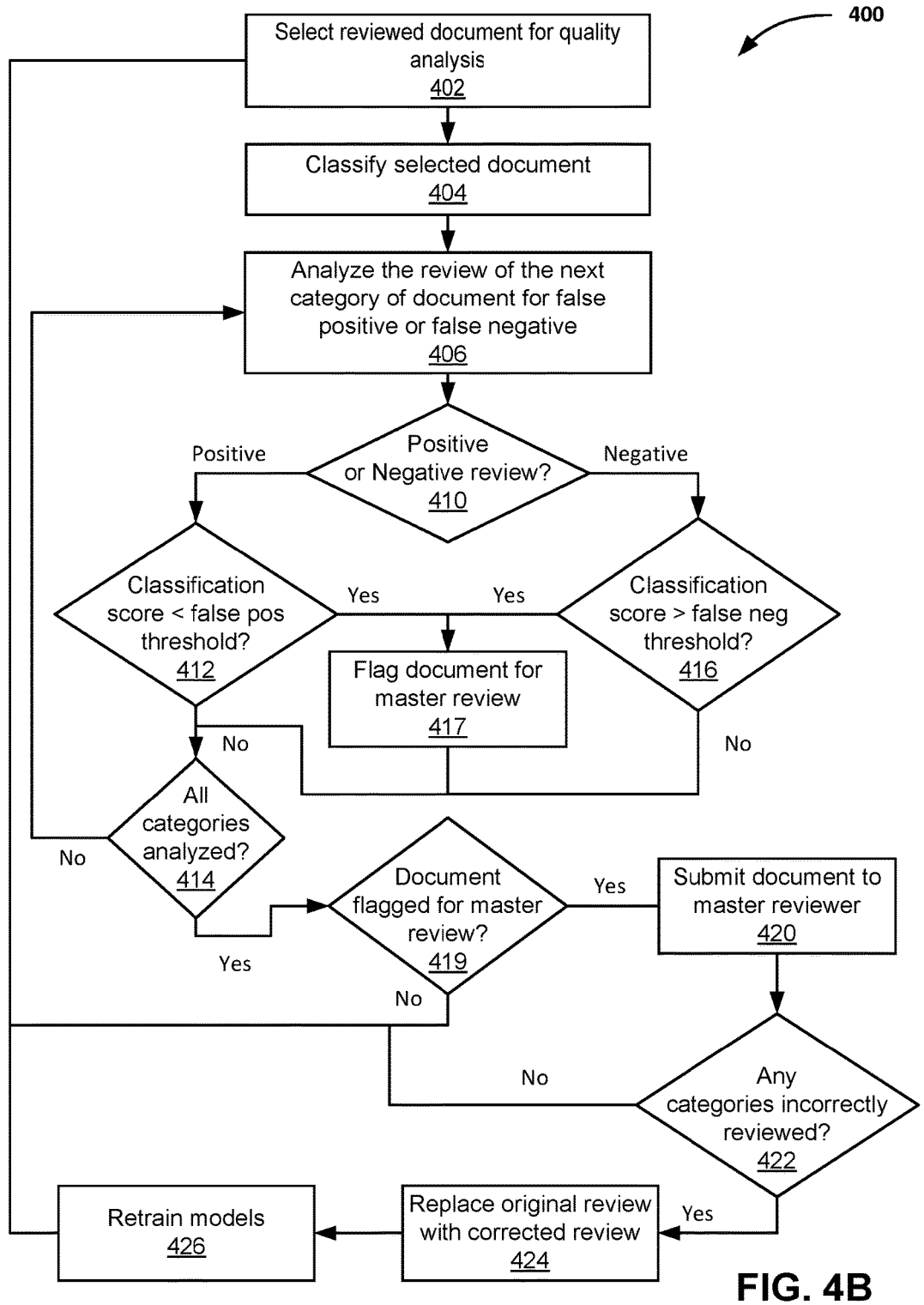
FIG. 4B is a flowchart illustrating another exemplary method for selecting and analyzing documents for review accuracy.

FIG. 4A is a flowchart of another example method 400 for selecting documents from the reviewed documents (training set) 112 and analyzing the selected documents for accuracy of the review. FIG. 4B is a flowchart of another example method 400 for selecting documents from the reviewed documents 112 and analyzing the selected documents for accuracy of the review. The steps 402-426 of FIGS. 4A and 4B illustrate the second process described elsewhere herein. FIGS. 4A and 4B differ from FIG. 3 in that FIGS. 4A and 4B provide additional details of a decision path. The steps 402-426 of FIGS. 4A and 4B include algorithms illustrating various means used for performing the second process described above.

At step 402 one or more reviewed documents 112 are selected for quality analysis. The selected documents may be selected from documents that have been reviewed and stored in the reviewed document repository 112. The selected documents may be selected using the quality manager 116. For simplicity a single selected document will be used for illustrating the second process of method 400. However, the second process may be performed using multiple selected documents. In some embodiments, the quality manager 116 may omit from selection documents in the reviewed document repository 112 that have been reviewed by a master reviewer 118.

At step 404, the selected document is reclassified using the models 106 and the classifier 104. The reclassification generates a category score for each category. At step 406 a category of the selected document is analyzed for a false positive or false negative review. The analysis may be performed using the quality manager 116.

At step 410 it is determined if the result or output of original review of the document category was positive or negative. If the original result was positive, the method 400 proceeds to step 412. If the original result was negative, the method 400 proceeds to step 416.

At step 412, it is determined if the category score is less than a false positive threshold. If the category score is less than the false positive threshold then the method proceeds to step 420. If the category score is not less than the false positive threshold then the method proceeds to step 414. At step 414, it is determined if all the categories in the selected document have been analyzed. If not then the method 400 returns to step 406 where analysis of the next category of the selected document is initiated. If all the categories have been analyzed then the method 400 returns to step 402 where the next document is selected for analysis.

At step 416, it is determined if the category score is greater than a false negative threshold. If the category score is greater than the false negative threshold then the method proceeds to step 420. If the category score is not greater than the false negative threshold then the method proceeds to step 418. At step 418, it is determined if all the categories in the selected document have been analyzed. If not then the method 400 returns to step 406 where analysis of the next category of the selected document is initiated. If all the categories have been analyzed then the method 400 returns to step 402 where the next document is selected for analysis.

At step 420 the document is submitted to a master reviewer 118 for review. The master reviewer 118 is a highly skilled or trained reviewer. It may be assumed that the review by the master reviewer 118 is correct. The master reviewer 118 reviews all the categories of the document. At step 422 it is determined if any of the categories have been incorrectly reviewed in the original review. This can be determined by comparing the results of the master review for each of the categories to the results of the original review. If all the results match for each of the categories, then none of the categories were incorrectly reviewed in the original review and the method 400 returns to step 402 where the next document is selected for analysis. If any of the categories do not match, i.e., were not correctly reviewed in the original review, then the method 400 proceeds to step 424.

In some embodiments, step 422 is omitted and the original review is replaced by the results of the master review for each document submitted to the master reviewer. That is step 420 proceeds directly to step 422 for any document submitted to a master reviewer without executing step 422.

At step 424, the results of the original review in the training set are replaced by the results of the master review. All of the results may be replaced or only the results that do not match. The document reviewer 110 may be rated based on how many results in the original review were incorrect. At step 426, the models 106 may be retrained using reviewed documents (training set) 112 and including the updated review results. The retraining at step 426 may be initiated for each master review that replaces an original review in the training set. In some embodiments, the retraining at step 314 is initiated after a predetermined number of master reviews.

Upon updating the models 106, the method 400 may return to step 402 where another document is selected from the reviewed documents 112. As discussed elsewhere herein, the first process (method 200) is running while the second process (method 400) is running. While the first and second processes are running simultaneously, the step 202 of method may use the models 106 that have been retrained in method 400 at the step 426. In some embodiments, the retraining performed at step 208 of method 200 may use master reviews that replace original reviews at step 424. The retrain models step 426 of method 400 may also be performed as step 208 of method 200. The selected documents may be drawn from the documents that have been reviewed in method 200 at the step 206. In some embodiments, the documents that are reviewed by the master reviewer 118 are withdrawn from consideration by the method 400. These documents may be flagged (e.g., at step 420) as having been reviewed by the master reviewer 118 during the method 400.

FIG. 4B differs from FIG. 4A in that: In the method illustrated in FIG. 4B, all categories are analyzed before submitting the document to a master reviewer. In FIG. 4B, step 418 is omitted and new steps 417 and 419 are included. The "no" branch of step 416 proceeds to step 414 in FIG. 4B, instead of step 418 as in FIG. 4A. The "yes" branch of 414 proceeds to step 419 in FIG. 4B, instead of step 402 as in FIG. 4A. The "yes" branches of steps 412 and 416 proceed to step 417 in FIG. 4B, instead of step 420 as in FIG. 4A.

At step 417, the document is flagged for master review. At step 419, if the document was flagged for master review at step 417, the method 400 proceeds to step 420 where the document is submitted to the master reviewer. However, if the document was not flagged for master review at step 417, the method 400 returns to step 402 where the next document is selected for analysis.

Examples of means for performing continuous active learning correspond to structures, materials, and/or acts described throughout the specification, claims, and figures, for example, an algorithm illustrated in at least portions of FIG. 2 and steps 202-212 described in detail elsewhere herein. Examples of means for correcting review errors in stored document reviews correspond to structures, materials, and/or acts described throughout the specification, claims, and figures, for example, an algorithm illustrated in at least portions of FIG. 3 and FIGS. 4A and 4B and steps 302-316 and 402-426 described in detail elsewhere herein. Examples of means for identifying documents having potential review errors correspond to structures, materials, and/or acts described throughout the specification, claims, and figures, for example, an algorithm illustrated in at least portions of FIG. 3 and FIGS. 4A and 4B and steps 302-308 and 402-422 described in detail elsewhere herein. Examples of means for updating classifier models correspond to structures, materials, and/or acts described throughout the specification, claims, and figures, for example, an algorithm illustrated in at least portions of FIG. 3 and FIGS. 4A and 4B and steps 310-316 and 420-426 described in detail elsewhere herein.

The terms "training models" and "building model'" may be used interchangeably throughout this disclosure. Similarly, the terms "model trainer" and "model builder" may be used interchangeably throughout this disclosure. Examples of machine classifiers 104 used in machine classification of documents 102 include machines that apply models built by model builders 114 using various techniques including Naive Bayes, Logistic Regression, Decision or classification Trees, Nearest Neighbors, Ensembles (Random Forests, Gradient Boosting), Neural Networks, Support Vector Machines (SVM), discriminate analysis, and/or the like.

A model builder 114 may analyze errors between data (e.g., document reviews) and expected values predicted by the machine classifier 104 using a model 106 and revise the model 106 to minimize the errors, using techniques understood by a person having ordinary skill in the arts with the present disclosure before them for various classifiers using various techniques including Naive Bayes, Logistic Regression, Decision or classification Trees, Nearest Neighbors, Ensembles (Random Forests, Gradient Boosting), Neural Networks, Support Vector Machines (SVM), discriminate analysis, and/or the like.

Figure 5:
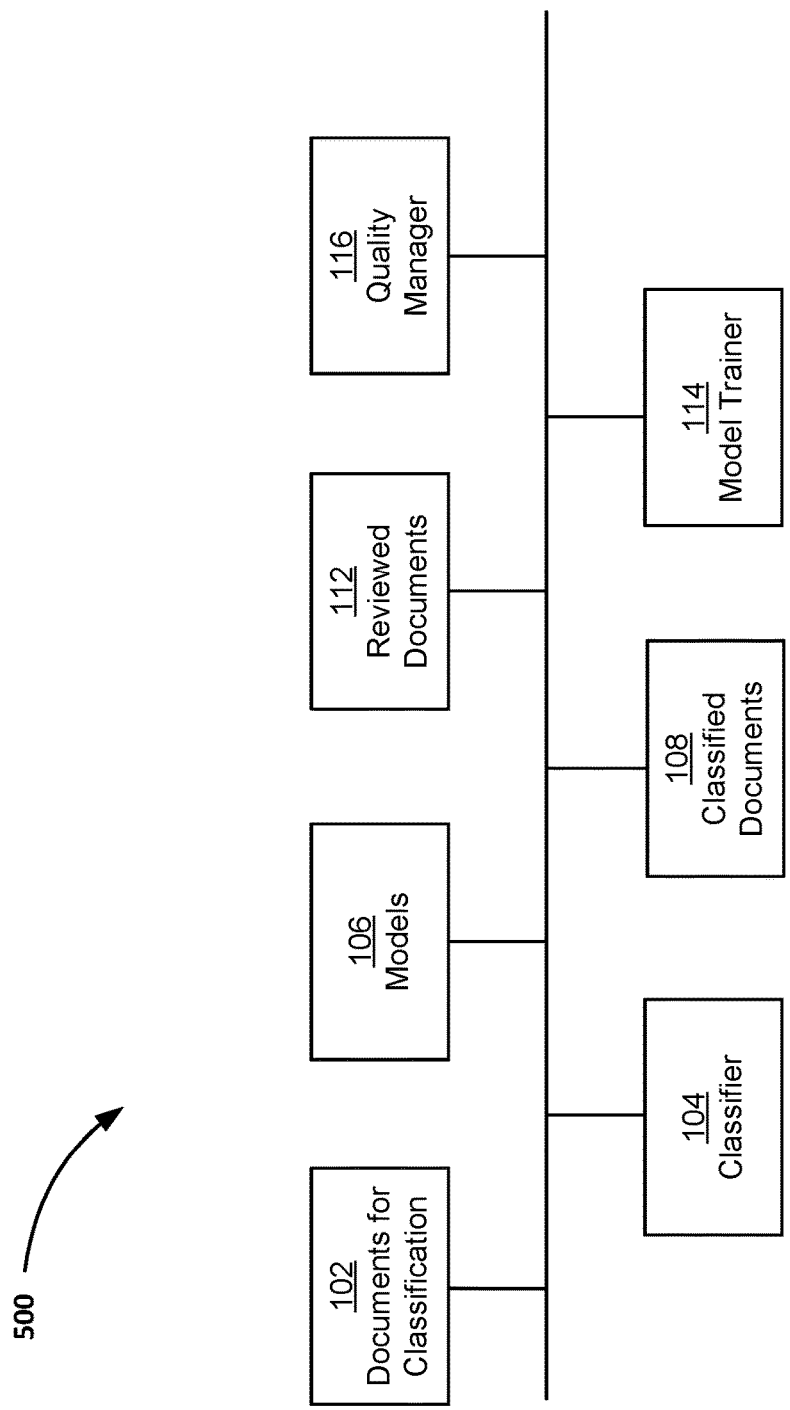
FIG. 5 illustrates another exemplary continuous active learning system.

FIG. 5 illustrates another exemplary continuous active learning system 500. System 500 differs from system 100 in that components system 200 (i.e., the documents for review 102, the classifier 104, the models 106, the classified documents 108, the reviewed documents (training set) 112, the model trainer 114, and the quality manager module 116) are illustrated as being implemented on a stand-alone system instead of the server 120. The document reviewers 110 and master reviewers 118 may communicate with system 500 directly or via a network (e.g., network 122).

Figure 6:
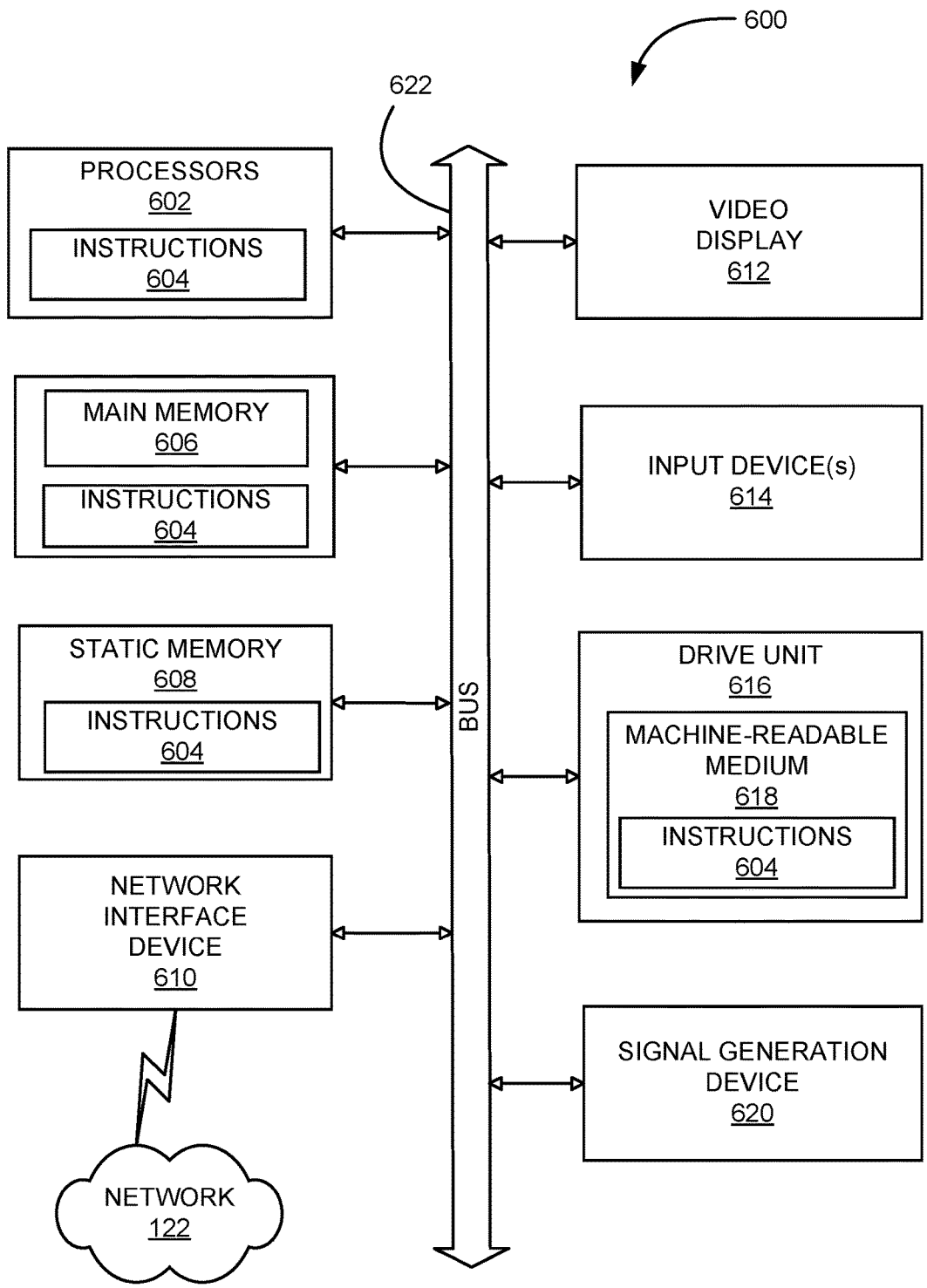
FIG. 6 is a schematic diagram of an exemplary computing system that is used to implement embodiments according to the present technology.

FIG. 6 is a diagrammatic representation of an example machine in the form of a computer system 600, within which a set of instructions for causing the machine to perform any of one or more of the methodologies discussed herein may be executed. In various example embodiments, the machine operates as a standalone device or may be connected (e.g., networked) to other machines. In a networked deployment, the machine may operate in the capacity of a server (e.g. server 120) or a client machine, in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated in FIG. 6, the term "machine" shall also be taken to include any collection of machines that individually or jointly execute a set (or multiple sets) of instructions to perform any one or more of the methodologies discussed herein The example computer system 600 includes a processor or multiple processor(s) 602 (e.g., a central processing unit (CPU), a graphics processing unit (GPU), or both), and a main memory 606 and static memory 608, which communicate with each other via a bus 622. The computer system 600 may further include a video display 612 (e.g., a liquid crystal display (LCD)). The computer system 600 may also include an alpha-numeric input device(s) 614 (e.g., a keyboard), a cursor control device (e.g., a mouse, trackball, touchpad, touch screen, etc.), a voice recognition or biometric verification unit (not shown), a drive unit 616 (also referred to as disk drive unit), a signal generation device 620 (e.g., a speaker), and a network interface device 610. The computer system 600 may further include a data encryption module (shown elsewhere herein) to encrypt data.

The disk drive unit 616 includes a computer or machine-readable medium 618 on which is stored one or more sets of instructions and data structures (e.g., instructions 604) embodying or utilizing any one or more of the methodologies or functions described herein. The instructions 604 may also reside, completely or at least partially, within the main memory 606 and/or within the processor(s) 602 during execution thereof by the computer system 600. The main memory 606 and the processor(s) 602 may also constitute machine-readable media.

The instructions 604 may further be transmitted or received over a network (e.g., network 122, see FIG. 1) via the network interface device 610 utilizing any one of a number of well-known transfer protocols (e.g., Hyper Text Transfer Protocol (HTTP)). While the machine-readable medium 618 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and/or the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art with the instant application before them will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
performing continuous active machine learning comprising:
 a) selecting a batch of documents from the set of documents that have not been reviewed;
 b) classifying the batch of documents using the plurality of models, each model trained to calculate a relevance of the document to at least one of a plurality of categories;
 c) selecting one or more classified documents from the classified batch of documents for review based on the classification;
 d) receiving a review of the selected documents, the review for each document including an identity of the document reviewer and a determination by the document reviewer that the document was either responsive or non-responsive for each of the plurality of categories;
 e) storing the review and reviewed document in a reviewed document repository with the identity of the document reviewer; and
 f) retraining the plurality of models based using the reviews and reviewed documents of the reviewed document repository to generate a plurality of models;
 g) repeating a-f; and
performing quality analysis while asynchronously executing performing the continuous active machine learning a-g, the quality analysis comprising:
 h) selecting one or more reviewed document from the reviewed document repository;
 j) classifying each of the selected the documents using the plurality of generated models to generate a category score for each category;
 k) analyzing each of the classified selected documents for each category to select documents for review by a master reviewer, the analyzing comprising submitting the document to the master reviewer if either:
  the document review for the category was relevant, and the category score is less than a false positive threshold, or
  the document review for the category was non-relevant, and the category score is greater than a false negative threshold,
 l) if the selected document is submitted to the master reviewer:
  receiving a review of the selected document from the master reviewer including a determination by the master reviewer that the document was either relevant or non-relevant for each of the plurality of categories,
  comparing the master review of the selected document to the review by the document reviewer, and
  replacing the review by the document reviewer in the reviewed document repository with the master review for the document if the review by the master reviewer for any category of the document is different from the review by the document reviewer for the category;
 m) if an original review for any of the selected documents is replaced in the reviewed document repository, retraining the plurality of models using the replaced reviews; and
 n) repeating h-m.

2. The method according to claim 1, further comprising storing an indication in the reviewed document repository that the document has been reviewed by the master reviewer for each document reviewed by the master reviewer.

3. The method according to claim 2, wherein documents previously reviewed by the master reviewer are not selected in h.

4. The method according to claim 1, wherein h-n are repeated continuously.

5. The method according to claim 1, wherein h-n are executed periodically according to a predetermined period of time.

6. The method according to claim 1, wherein h-n are executed periodically according at random periods of time.

7. The method according to claim 1, wherein h-n are executed periodically according to a predetermined number of times a-g have been executed.

8. The method according to claim 1, wherein the documents stored are stored in the document repository as reference identifiers.

9. The method according to claim 1, wherein the documents stored are stored in the document repository as text.

10. The method according to claim 1, wherein the category score is a probability that the document is relevant to the category.

11. The method according to claim 1, further comprising tracking a number of documents incorrectly reviewed by a particular document reviewer.

12. The method according to claim 11, further comprising promoting the document reviewer to status of master reviewer based on the tracked number of documents incorrectly reviewed by a the document reviewer.

13. The method according to claim 1, further comprising tracking a number of times a category is incorrectly reviewed by a particular document reviewer.

14. The method according to claim 1, further comprising comparing a first number of documents incorrectly reviewed by a first document reviewer to a second number of documents incorrectly reviewed by a second document reviewer.

15. The method according to claim 1, further comprising adjusting the false positive threshold or false negative threshold for a category based on a number of times the category is incorrectly reviewed.

16. The method according to claim 1, the selected batch includes documents that have been previously classified.

17. The method according to claim 16, wherein the selected batch does not include documents that have been previously reviewed.

18. A non-transitory computer readable storage media having a program embodied thereon, the program being executable by a processor to perform a method for retraining one or more models of a machine classifier, the method comprising:
 selecting a reviewed document and corresponding original review stored in a training set for one or more trained models of the machine classifier;
 classifying the selected document using the one or more models to generate a category score for each category using the machine classifier;
 comparing the generated category scores for the selected document to original review of the selected document;

submitting the selected document to a master reviewer for master review if either:
  any category score is less than a false positive threshold and the original review is positive for a category, or
  any category score is greater than a false negative threshold and the original review is negative for a category;
receiving a master review of the selected document from the master reviewer;
comparing the received master review of the selected document to the original review of the selected document;
replacing the original review in the training set with the received master review if the received master review for any category of the document is different from the original review for the category; and
initiating retraining of the one or more models if the original document review in the training set has been replaced by the received master review.

19. A system comprising:
a document classifier;
a training set;
a model builder;
a means for performing continuous active machine learning using the classifier, the model trainer, and document reviews in the training set to retrain classifier models used by the classifier for classifying documents received from a document repository, the means for performing continuous active machine learning executed continuously; and
a means for correcting review errors in training corpus, the means for correcting review errors configured to be executed continuously and asynchronously with respect to the means for performing continuous active machine learning, the means for correcting review errors comprising:
  a means for identifying document reviews in the training set having potential review errors using the classifier models; and
  a means for updating classifier models using master reviews, document reviews stored in the training set, and the model trainer.

20. The system according to claim 19, wherein document repository includes documents that have not been classified.

* * * * *